US006208340B1

United States Patent
Amin et al.

(10) Patent No.: US 6,208,340 B1
(45) Date of Patent: Mar. 27, 2001

(54) GRAPHICAL USER INTERFACE INCLUDING A DROP-DOWN WIDGET THAT PERMITS A PLURALITY OF CHOICES TO BE SELECTED IN RESPONSE TO A SINGLE SELECTION OF THE DROP-DOWN WIDGET

(75) Inventors: Sandip Amin; Hatim Yousef Amro, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/084,413

(22) Filed: May 26, 1998

(51) Int. Cl.[7] .................................................. G06F 3/00
(52) U.S. Cl. .................... 345/339; 345/334; 345/347; 345/352; 345/354
(58) Field of Search .................... 345/144, 333, 345/334, 335, 339, 347, 352, 354

(56) References Cited

U.S. PATENT DOCUMENTS

| 5,276,795 |   | 1/1994  | Hoeber et al. ............... 395/156 |
|-----------|---|---------|---------------------------------------|
| 5,276,797 | * | 1/1994  | Bateman et al. .............. 345/352 |
| 5,317,687 |   | 5/1994  | Torres ......................... 395/159 |
| 5,444,615 |   | 8/1995  | Bennett et al. ................ 364/401 |
| 5,537,618 |   | 7/1996  | Boulton et al. ................ 395/161 |
| 5,664,133 | * | 9/1997  | Malamud et al. ............... 345/352 |
| 5,781,193 | * | 7/1998  | Alimpich et al. .............. 345/352 |
| 5,784,059 | * | 7/1998  | Morimoto et al. .............. 345/353 |
| 5,867,162 | * | 2/1999  | O'Leary et al. ............... 345/352 |
| 5,999,228 | * | 12/1999 | Matsuura et al. ............... 345/327 |

* cited by examiner

Primary Examiner—Raymond J. Bayerl
Assistant Examiner—Cuong T. Thai
(74) Attorney, Agent, or Firm—Volel Emile; Felsman, Bradley, Vaden, Gunter & Dillon, LLP

(57) ABSTRACT

A data processing system and method of operating a graphical user interface of a data processing system are described. According to the method, a dropdown widget is displayed within the display device of a data processing system. In response to selection of the drop-down widget, a drop-down list is displayed, which contains a plurality of choices. The user is then permitted to select multiple choices from the drop-down list in response the single selection of the drop-down widget. In one embodiment, the drop-down list includes a plurality of preferences that are each displayed in association with a respective control element, such as a radio button.

18 Claims, 3 Drawing Sheets

GRAPHICAL USER INTERFACE INCLUDING A DROP-DOWN WIDGET THAT PERMITS A PLURALITY OF CHOICES TO BE SELECTED IN RESPONSE TO A SINGLE SELECTION OF THE DROP-DOWN WIDGET

BACKGROUND OF THE INVENTION

1. Technical Field

The present invention relates in general to a method and system for data processing and, in particular, to a graphical user interface for a data processing system. Still more particularly, the present invention relates to a graphical user interface and method of operation in which a plurality of choices can be selected from a drop-down list in response to a single selection of the associated drop-down widget.

2. Description of the Related Art

Within data processing systems, user interface can be accomplished in a variety of ways. A now nearly universal format of user interface for personal computer systems and personal digital assistants (PDAs) is a graphical user interface (GUI), which provides a user with a graphical and intuitive display of information. Typically, the user interacts with a GUI display utilizing a graphical pointer, which a user controls utilizing a graphical pointing device, such as a mouse, track ball, glidepad, or stylus. Depending upon the actions allowed by the application or operating system software, the user can select a widget (i.e., a user-discernable feature of the graphical display such as an icon) by positioning the graphical pointer over the widget and making a selection utilizing the graphical pointing device.

The actions available to a user following selection of a widget can depend upon a number of factors, including the type of widget that was selected and the order of the selection in the current interaction scenario. For example, if the user selects a icon on the desktop or within a window with a single "click," the user can typically relocate the icon within the graphical display utilizing the well-known drag-and-drop technique. Alternatively, if the selected widget is a menu bar choice, a pull-down menu is typically displayed, permitting the user to make a single selection from among the choices listed in the pull-down menu. In response to either the selection of a point outside of the pull-down menu (indicating that the user does not wish to select any choice listed in the pull-down menu) or the selection of a pull-down menu choice, the pull-down menu closes automatically.

It is upon the behavior of a widget following selection that the present invention improves.

SUMMARY OF THE INVENTION

It is therefore one object of the present invention to provide an improved data processing system.

It is another object of the present invention to provide an improved graphical user interface for a data processing system.

It is yet another object of the present invention to provide a graphical user interface and method of operation in which a plurality of choices can be selected from a drop-down list in response to a single selection of the associated drop-down widget.

The foregoing objects are achieved as is now described. A drop-down widget is displayed within the display device of a data processing system. In response to selection of the drop-down widget, a drop-down list is displayed, which contains a plurality of choices. The user is then permitted to select multiple choices from the drop-down list in response the single selection of the drop-down widget. In one embodiment, the drop-down list includes a plurality of preferences that are each displayed in association with a respective control element, such as a radio button.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
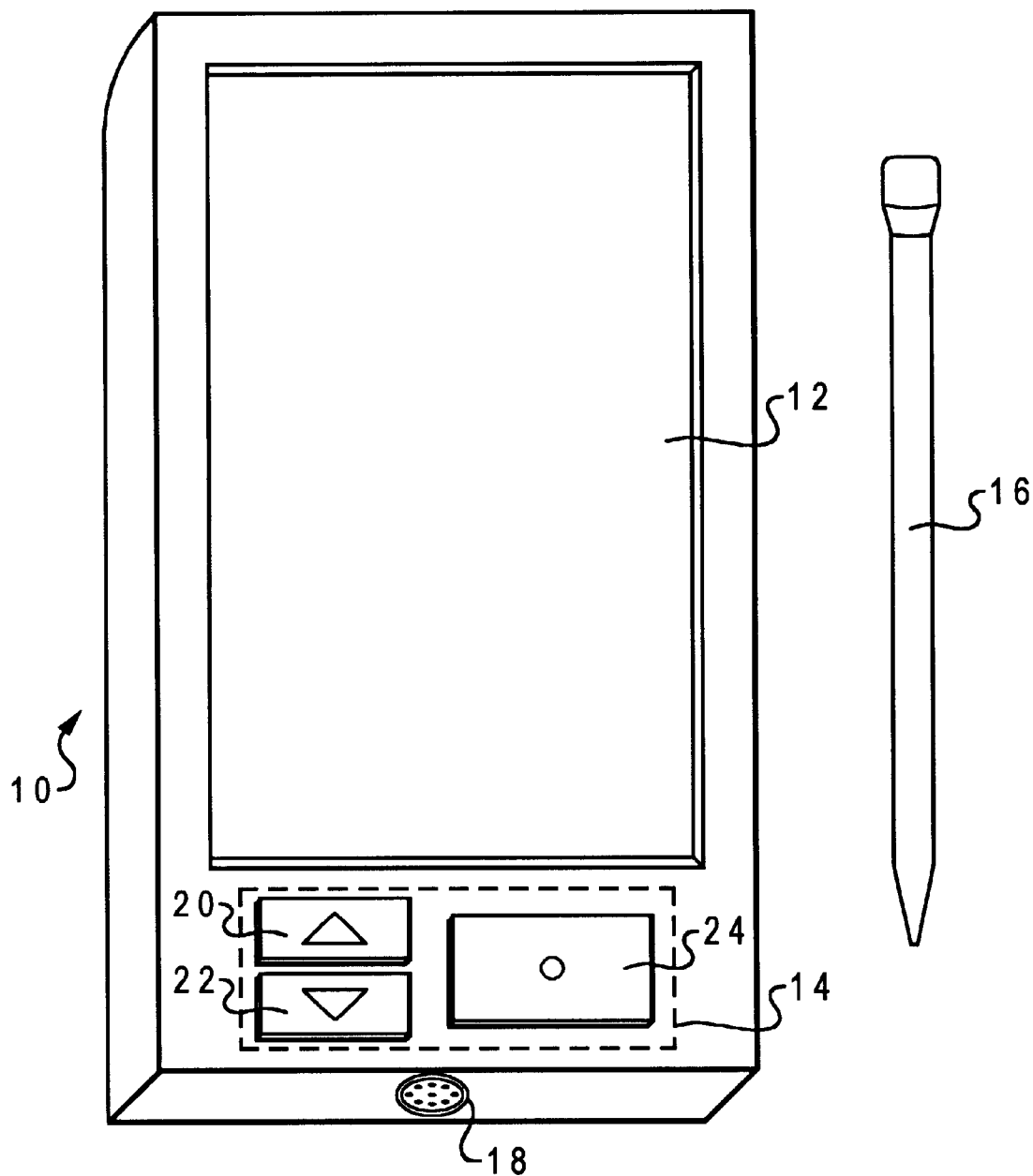
FIG. 1 depicts an illustrative embodiment of a data processing system with which the method and system of the present invention may advantageously be utilized.

With reference now to the figures and in particular with reference to FIG. 1, there is depicted an illustrative embodiment of a data processing system with which the present invention may advantageously be utilized. As shown, the data processing system comprises a hand-held personal digital assistant (PDA) 10, including a display 12, keypad 14, stylus 16, and communication port 18. Display 12, which is preferably implemented with a liquid crystal display (LCD) or other low-power, light-weight display technology, is utilized to display information to the user via a graphical user interface (GUI) in which hardware and software objects are viewed and controlled through the selection and manipulation of associated widgets displayed within display 12. A user can select and manipulate widgets displayed within display 12 in two ways. First, the user can touch display 12, which is overlayed with a touch panel, with stylus 16 to indicate a location within display 12. The user can also communicate inputs via the up arrow key 20, down arrow key 22, and enter key 24 provided in keypad 14. Of course, other data processing system embodiments may provide other input devices to interact with a GUI, such as a trackpoint, a glidepad, or a mouse.

Figure 2:
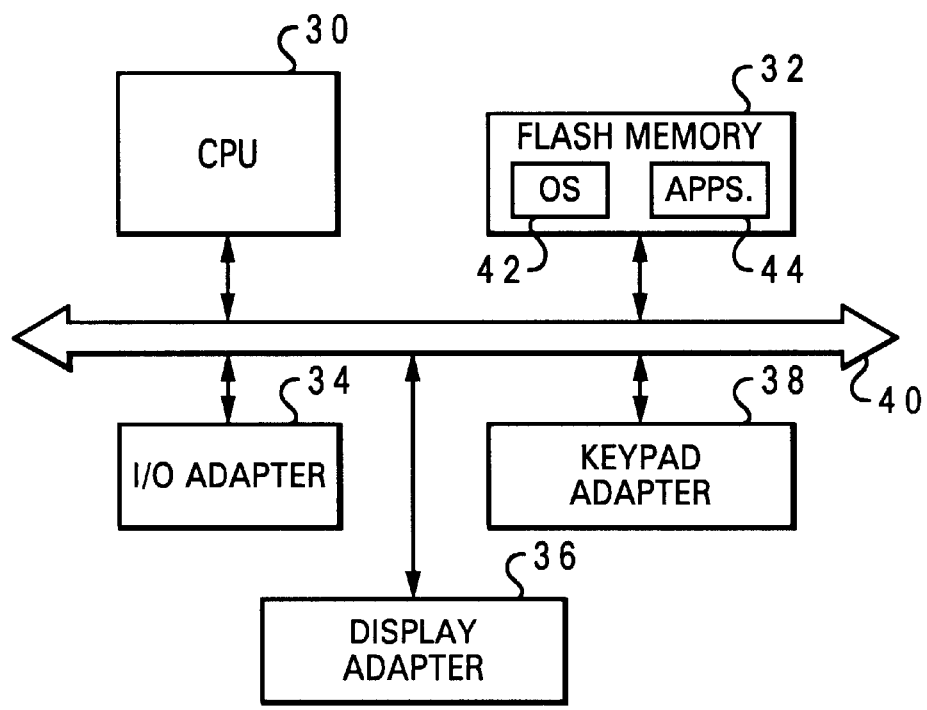
FIG. 2 is a block diagram of the internal circuitry of the data processing system shown in FIG. 1.

Referring now to FIG. 2, there is depicted a block diagram of the internal circuitry of PDA 10. As illustrated, PDA 10 includes a central processing unit (CPU) 30, flash memory 32, input/output (I/O) adapter 34, display adapter 36, and keypad adapter 38, all of which are coupled to a system bus 40. CPU 30 executes an operating system (OS) 42 and applications 44 stored within flash memory 32. Applications 44 may include, for example, calendaring and database software that provide a user with a convenient mechanism for storing, organizing, and retrieving personal data such as a daily or monthly schedule and an address book. As noted above, OS 42 and applications 44 preferably interact with a user via a GUI, which as described below with respect to FIGS. 3 and 4, includes at least one drop-down widget in accordance with the present invention. Adapters 34, 36, and 38 provide interfaces between system bus 40 and communication port 18, display 12, and keypad 14, respectively. Through communication port 18, which preferably comprises a serial port, data processing system 10 can be connected to a digital or analog communication network (e.g., the Internet or World Wide Web) or another data processing system for data communication.

Figure 3:
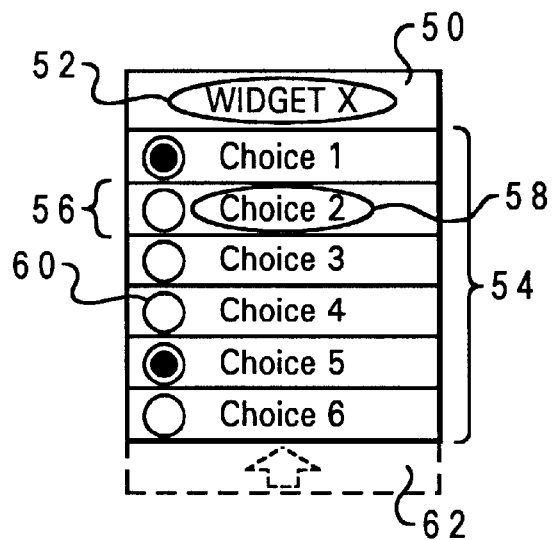
FIG. 3 illustrates a drop-down widget in accordance with the present invention.

With reference now to FIG. 3, there is illustrated an exemplary embodiment of a drop-down widget within a GUI in accordance with the present invention. As shown, drop-down widget 50 is a user-discernable feature of a GUI that may represent, for example, a program, function, action, hardware component, data collection, menu bar item, or user preference. The "thing" represented by widget 50 is preferably indicated to the user by a textual or graphical widget label 52 (e.g., "WIDGET X") displayed in or adjacent to widget 50.

Figure 4:
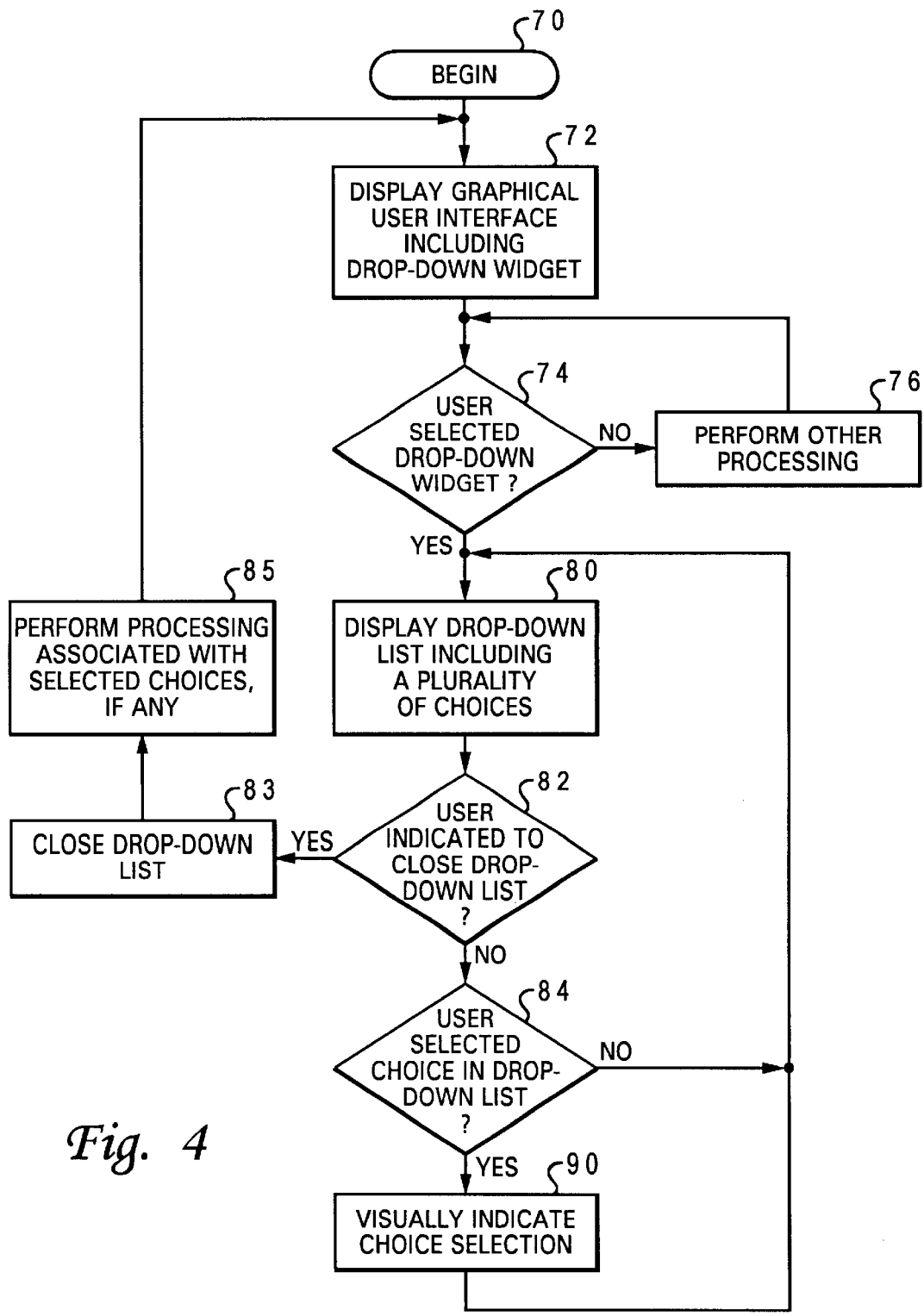
FIG. 4 is a high level logical flowchart of a method of operating a data processing system graphical user interface including a drop-down widget in accordance with the present invention.

Widget 50 has an associated drop-down list 54 that is displayed only in response to the selection of widget 50, as described further infra with respect to FIG. 4. Drop-down list 54 contains multiple individually selectable choices 56 that are each indicated by a textual or graphical choice label 58. Each of choices 56 in drop-down list 54 is preferably displayed with a graphical indication of whether or not that choice is currently selected. Such graphical indication may involve highlighting selected choices or displaying a graphical element, such as a radio button 60 or a check mark (√), in conjunction with at least selected choices. As shown in FIG. 3, for embodiments in which the graphical indication of selection comprises a radio button 60, a radio button 60 is preferably displayed in conjunction with each choice 56, but selection dots are only displayed within the radio buttons of selected choices (e.g., Choice 1 and Choice 5). Finally, as indicated by dashed-line illustration, a roll-up widget 62 may optionally be appended to the end of drop-down list 54 to explicitly indicate to the user that drop-down list 54 can be closed by selecting roll-up widget 62 (although drop-down list is preferably also closed in response to reselection of widget 50 or any other point outside of the boundary of window list 54).

Referring now to FIG. 4, there is illustrated a high level logical flowchart of a method of operating a data processing system GUI including a drop-down widget in accordance with the present invention. As depicted, the process begins at block 70 and thereafter proceeds to block 72, which illustrates a data processing system, such as data processing system 10 of FIG. 1, displaying a GUI including a drop-down widget, such as drop—down widget 50 of FIG. 3. As noted above, the displayed drop-down widget can be any user-discernable feature of the graphic display, including an icon, a menu bar item, a window element, etc. A determination is then made at block 74 whether or not the user has selected the drop-down widget. In data processing system 10 of FIG. 1, the user can select a drop-down widget by simply touching the surface of the touch panel overlaying display 12 with the tip of stylus 16. Alternative data processing system embodiments can implement selection of a drop-down widget in whatever manner that other widgets can be selected. For example, in data processing systems that employ a GUI that utilizes a graphical pointer as an on-screen cursor, a drop-down widget can be selected by positioning the graphical pointer over the widget and depressing or "clicking" (pressing and releasing) a selection control, such as a glidepad surface or left mouse button. In response to a determination at block 74 that the user has not selected the drop-down widget, the process proceeds to block 76, which illustrates the data processing system performing other processing, and then returns to block 74.

In response to a determination at block 74 that the user has selected the drop-down widget, the process passes from block 74 to block 80. Block 80 depicts the data processing system displaying a drop-down list (e.g., drop-down list 54) extending from the drop-down widget. As shown in FIG. 3, the drop-down list contains a plurality of choices that may be individually selected by the user. The process then proceeds to block 82, which depicts a determination of whether or not the user has indicated that the drop-down list is to be closed. The user can indicate that the drop-down list is to be closed in a number of ways, depending upon implementation. For example, in data processing system 10 of FIG. 1, the user indicates that the drop-down list is to be closed by touching the touch panel overlaying display 12 at any location outside of the drop-down list. In other data processing system embodiments, other techniques may be used, such as releasing a depressed selection control (e.g., left mouse button), "clicking" a selection control, etc. If the user has indicated that the drop-down list is to be closed, the process passes to block 83, which depicts the data processing system closing the drop-down list. The process then passes to block 85, which illustrates the data processing system performing the processing associated with the selected choices, if any, within the drop-down list. Thereafter, the process returns to block 72, which represents the continued display of the GUI. Alternatively, in response to a determination at block 82 that the user has not indicated that the drop-down list is to be closed, the process proceeds to block 84.

Block 84 illustrates the data processing system determining whether or not the user has selected a choice contained within the drop-down list. Again the selection methodology is data processing system-dependent. For data processing system 10, the user selects a desired choice within a drop-down list by touching the touch panel overlaying display 12 with stylus 16 at a location corresponding to the desired choice. Other data processing system embodiments may permit selection of a choice within a drop-down list by positioning a graphical pointer over the desired choice and "clicking" a selection control (e.g., a right mouse button). In response to a determination at block 84 that the user has not selected a choice within the drop-down list, the process returns to block 82, which has been described. However, in response to a determination that the user has selected a choice within the drop-down list, the user's selection is visually indicated at block 84, for example, by highlighting, displaying a check mark adjacent to the choice label of the selected choice, or displaying a selection dot in a radio button. Thereafter, the process returns to block 80, which represents the continued display of the drop-down list. Importantly, because the drop-down list remains open following the selection of a choice within the drop-down list, the user can advantageously select multiple choices following a single selection of the drop-down widget.

As has been described, the present invention provides an improved GUI that includes a drop-down widget having several benefits over conventional widgets. First, a drop-down widget in accordance with the present invention permits multiple choices to be selected from a drop-down list in response to only a single selection of a drop-down widget. In this manner, a user can more efficiently interact with a data processing system and is permitted to review all selected choices without having to again open the drop-down list following each selection of a choice. Second, a drop-down widget in accordance with the present invention conserves area within a data processing system display, while still permitting a user easy access to a list of actions, preferences, etc. This advantage is particularly important for data processing systems such as PDAs and "palmtop" personal computers, which have relatively small displays.

While the invention has been particularly shown and described with reference to a preferred embodiment, it will be understood by those skilled in the art that various changes in form and detail may be made therein without departing from the spirit and scope of the invention. For example, although the present invention has been described with references to a PDA, it should be understood that the present invention is applicable to any other data processing system having a GUI, such as a "palmtop" personal computer, point-of-sale (POS) computer, photocopier, electronic instrument, appliance, or automated teller machine (ATM).

Furthermore, although aspects of the present invention have been described with respect to specific "method steps" implementable on a data processing system, in an alternative embodiment the present invention may be implemented as a program product for use with a data processing system. Those skilled in the art should readily appreciate that programs defining the functions is of the present invention can be delivered to a computer in many forms, which include without limitation: (a) information permanently stored on non-writable storage media (e.g., ROM or CD-ROM); (b) information alterably stored on writable storage media (e.g., floppy or hard disks; or (c) information conveyed to a data processing system through communication media, such as analog and digital communication networks. It should be understood, therefore, that such media, when carrying computer readable instructions that direct the method functions of the present invention, represent alternative embodiments of the present invention.

What is claimed is:

1. A method of operating a graphical user interface of a data pressing system having a display device, said method comprising:
    displaying a widget within the display device;
    in response to selection of the widget, displaying a drop-down list from said widget, said drop-down list containing a plurality of choices and a roll-up widget;
    permitting multiple choices to be selected from said drop-down list in response a single selection of said widget; and
    in response to selection of the roll-up widget, closing the drop-down list and processing choices in the drop-down list that were selected.

2. The method of claim 1, wherein displaying a dropdown list comprises displaying a list including a plurality of preferences.

3. The method of claim 2, each of said plurality of preferences being displayed in association with a respective one of a plurality of control elements.

4. The method of claim 3, each of said plurality of control elements comprising a radio button.

5. The method of claim 1, and further comprising:
    displaying a graphical pointer within said display device, wherein said widget is selected by positioning said graphical pointer on said widget and manipulating a selection control.

6. The method of claim 5, wherein said selection control is a first selection control, said method further comprising closing said drop-down list in response to manipulation of a second selection control.

7. A data processing system, comprising:
    a display device;
    means for displaying a widget within the display device;
    means, responsive to selection of the widget, for displaying a drop-down list from said widget, said drop-down list containing a plurality of choices and a roll-up widget;
    means for permitting multiple choices to be selected from said drop-down list in response a single selection of said widget; and
    means, response to selection of the roll-up widget, for closing the drop-down list and processing choices in the drop-down list that were selected.

8. The data processing system of claim 7, said means for displaying a drop-down list comprising means for displaying a list including a plurality of preferences.

9. The data processing system of claim 8, each of said plurality of preferences in said drop-down list being displayed in association with a respective one of a plurality of control elements.

10. The data processing system of claim 9, each of said plurality of control elements comprising a radio button.

11. The data processing system of claim 7, and further comprising a selection control and means for displaying a graphical pointer within said display device, wherein said widget is selected by positioning said graphical pointer on said widget and manipulating said selection control.

12. The data processing system of claim 11, wherein said selection control is a first selection control and wherein said data processing system further comprises means for closing said drop-down list in response to manipulation of a second selection control.

13. A program product for use by a data processing system including a display device, said program product comprising:
    a computer usable medium in which instruction means are encoded, said instruction means including:
        instruction means for causing the data processing system to display a widget within the display device;
        instruction means, responsive to selection of the widget, for causing the data processing system to display a drop-down list from said widget, said drop-down list containing a plurality of choices and a roll-up widget;
        instruction means for causing said data processing system to permit multiple choices to be selected from said drop-down list in response a single selection of said widget; and
        instructions means, responsive to selection of the roll-up widget, for causing the data processing system to close the drop-down list and process choices in the drop-down list that were selected.

14. The program product of claim 13, wherein said instruction means for causing said data processing system to display a drop-down list comprises instruction means for causing said data processing system to display a list including a plurality of preferences.

15. The program product of claim 14, each of said plurality of preferences being displayed in association with a respective one of a plurality of control elements.

16. The program product of claim 15, each of said plurality of control elements comprising a radio button.

17. The program product of claim 13, and further comprising:
    instruction means for causing said data processing system to display a graphical pointer within said display device, wherein said widget is selected by positioning said graphical pointer on said widget, and manipulating a selection control.

18. The program product of claim 17, wherein said selection control is a first selection control, said program product further comprising instruction means for causing said data processing system to close said drop-down list in response to manipulation of a second selection control.

* * * * *